Figure 1:
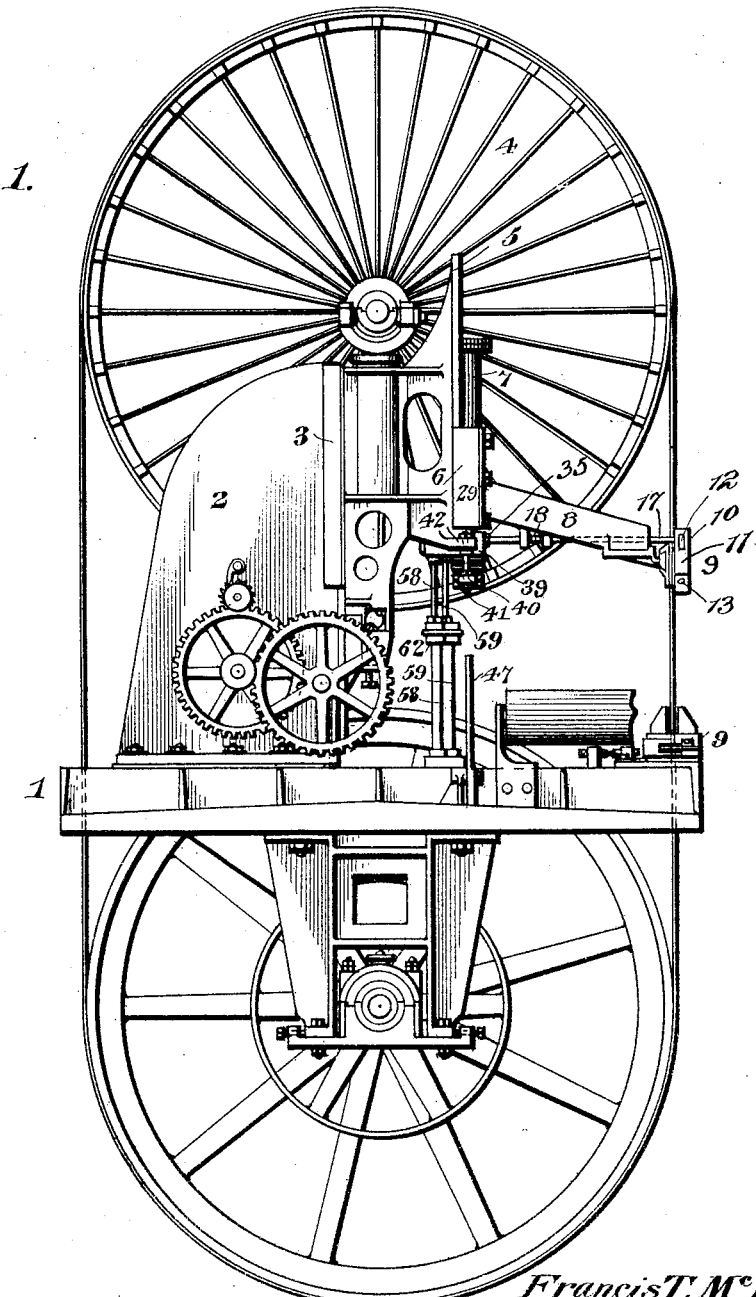

No. 778,990. PATENTED JAN. 3, 1905.
F. T. McDONOUGH.
BAND SAW GUIDE.
APPLICATION FILED OCT. 7, 1903.

5 SHEETS—SHEET 1.

Francis T. McDonough,
Inventor

Witnesses
Jas. K. McCathran
N. F. Riley

By
E. G. Siggers
Attorney

No. 778,990. PATENTED JAN. 3, 1905.
F. T. McDONOUGH.
BAND SAW GUIDE.
APPLICATION FILED OCT. 7, 1903.

5 SHEETS—SHEET 3.

Francis T. McDonough,
Inventor

Witnesses
Jas. F. McCathran
W. J. Riley

By C. G. Siggers
Attorney

No. 778,990. PATENTED JAN. 3, 1905.
F. T. McDONOUGH.
BAND SAW GUIDE.
APPLICATION FILED OCT. 7, 1903.
5 SHEETS—SHEET 4.
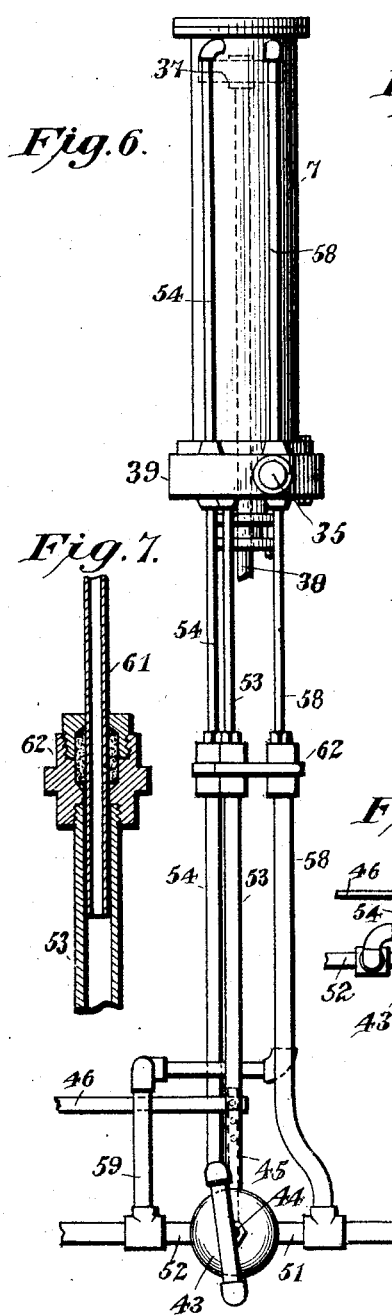
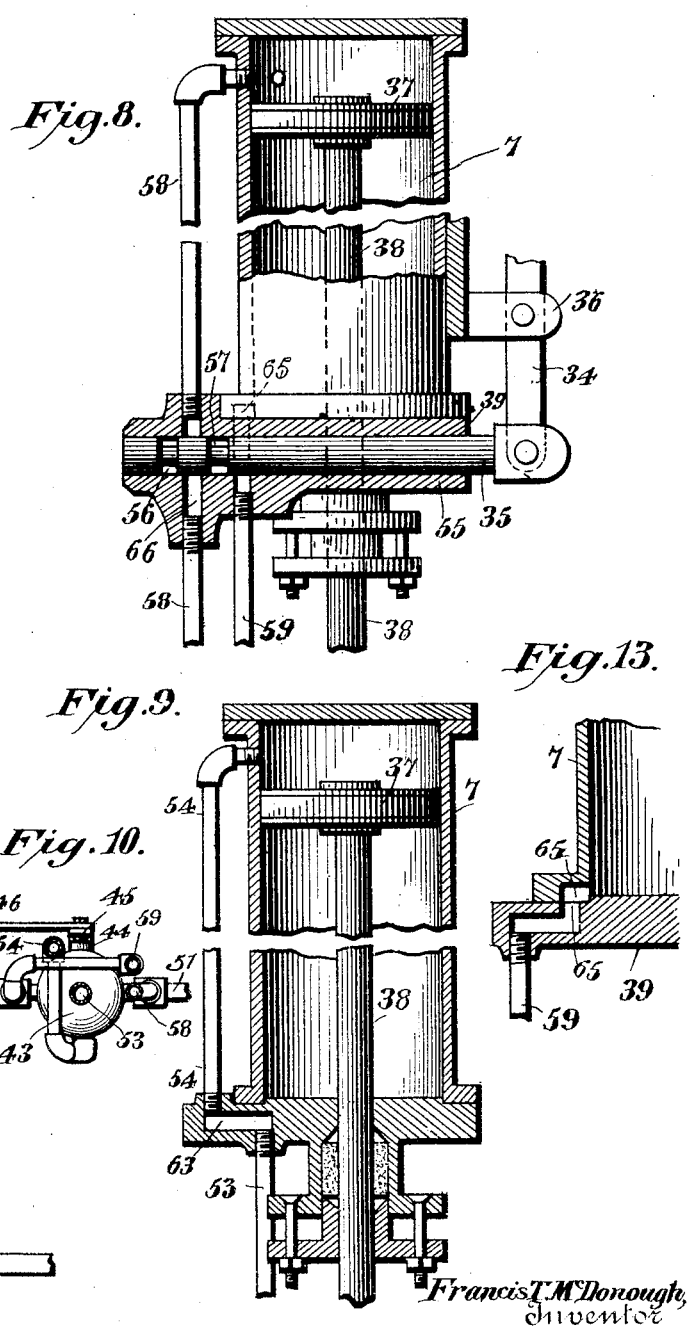
Witnesses
Jas. K. McCathran
H. J. Riley
Francis T. McDonough,
Inventor
By C. G. Siggers
Attorney No. 778,990. PATENTED JAN. 3, 1905.
F. T. McDONOUGH.
BAND SAW GUIDE.
APPLICATION FILED OCT. 7, 1903.

5 SHEETS—SHEET 5.

Francis T. McDonough, Inventor

Witnesses
Jas. F. McCathran

By
C. G. Siggers
Attorney

No. 778,990. Patented January 3, 1905.

UNITED STATES PATENT OFFICE.

FRANCIS THOMAS McDONOUGH, OF EAU CLAIRE, WISCONSIN.

BAND-SAW GUIDE.

SPECIFICATION forming part of Letters Patent No. 778,990, dated January 3, 1905.

Application filed October 7, 1903. Serial No. 176,132.

*To all whom it may concern:*

Be it known that I, FRANCIS THOMAS MC-DONOUGH, a citizen of the United States, residing at Eau Claire, in the county of Eau Claire and State of Wisconsin, have invented a new and useful Band-Saw Guide, of which the following is a specification.

The invention relates to an automatic band-saw guide.

The object of the present invention is to improve the construction of band-saw guides, more especially the means for operating the same, and to provide a simple, inexpensive, and efficient automatic band-saw guide which when it is struck by a log will automatically raise itself clear of the same by a direct vertical movement, but which when clear of the log will remain in such position until adjusted by hand.

A further object of the invention is to enable the saw-guide to be readily raised and lowered by hand to adjust the guide to logs of different diameters.

The invention also has for its object to provide a saw-guide of this character which will be carried by the supports for the upper band-saw wheel, whereby when the latter is adjusted to accommodate saws of different lengths there will be no liability of varying the relative arrangement of the saw-guide and the upper band-saw wheel, and the guide will be effectually prevented from accidentally coming in contact with the wheel and being broken or otherwise injured by the same.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 2:
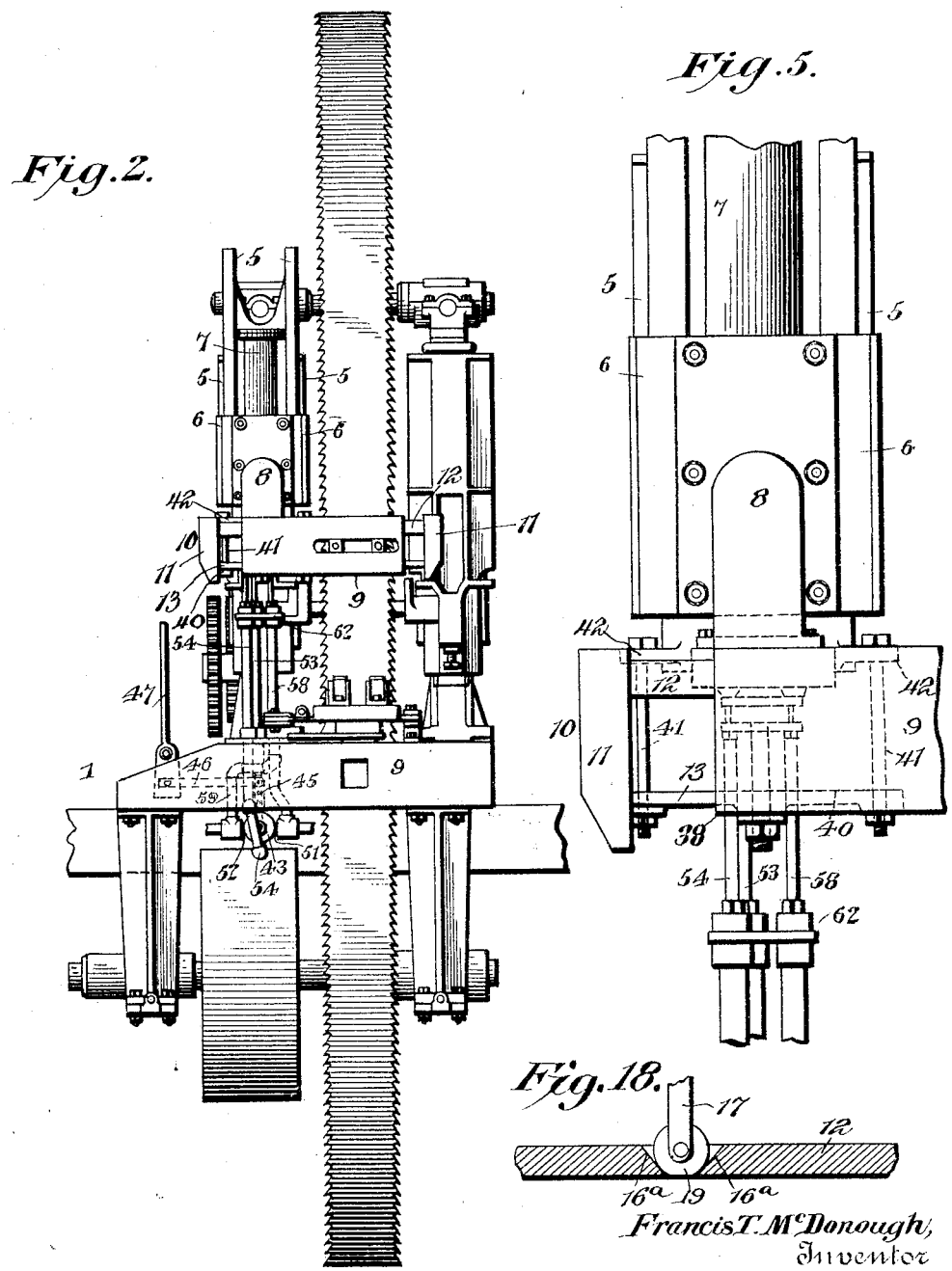
Figure 3:
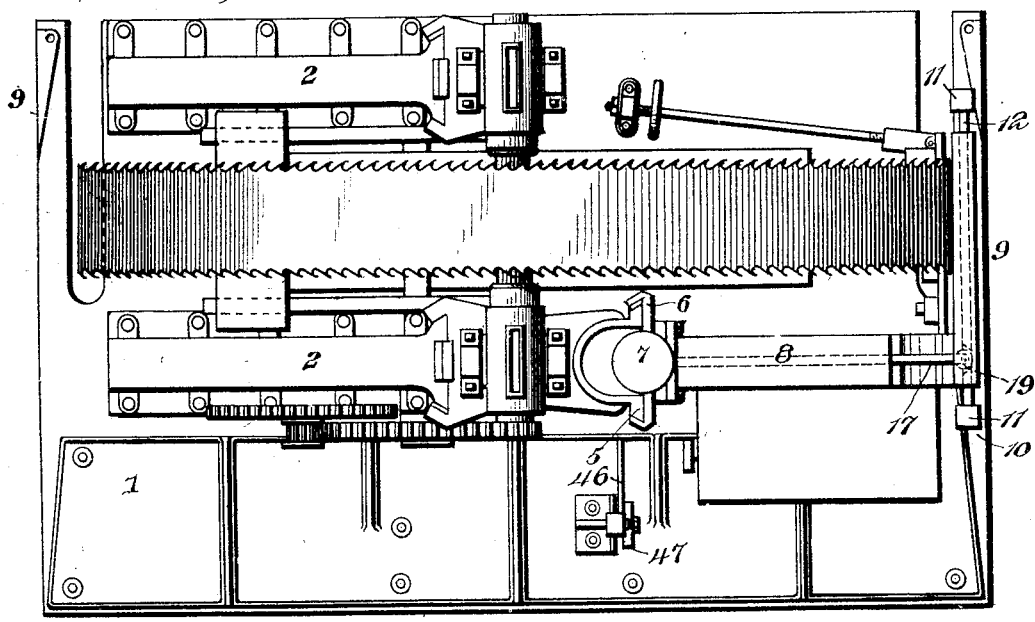
Figure 4:
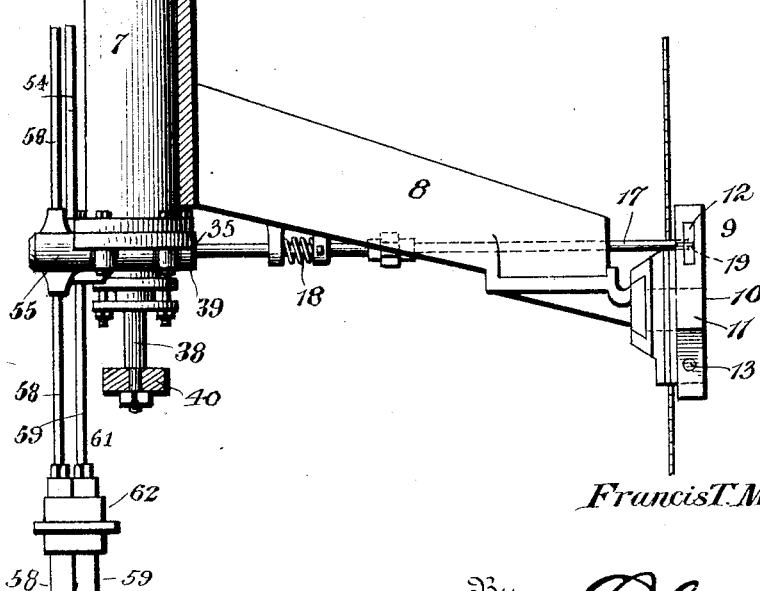
Figure 11:
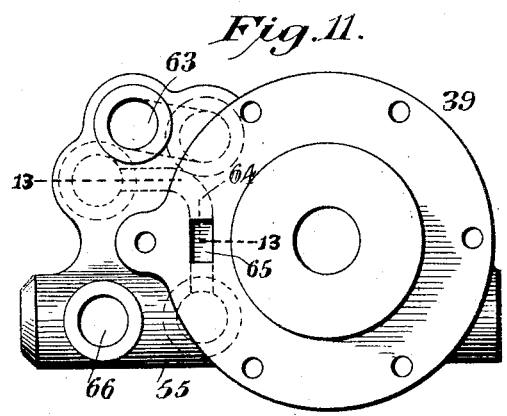
Figure 12:
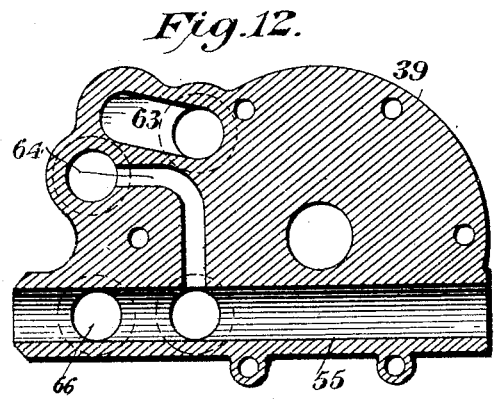
Figure 14:
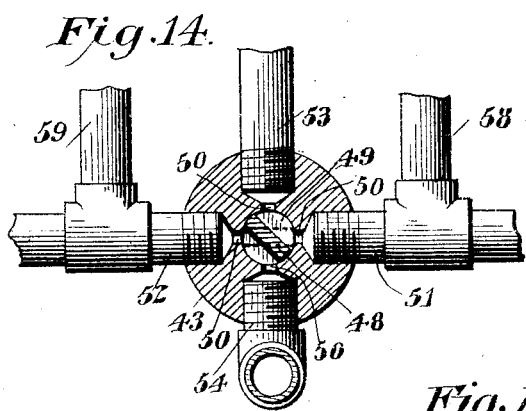
Figure 15:
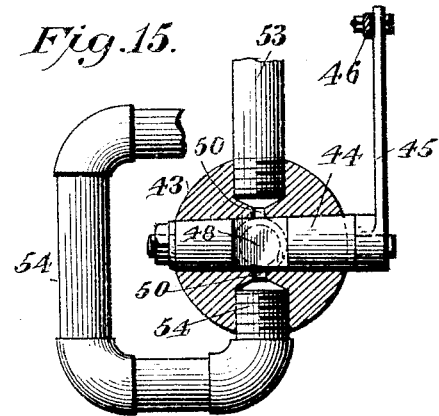
Figure 16:
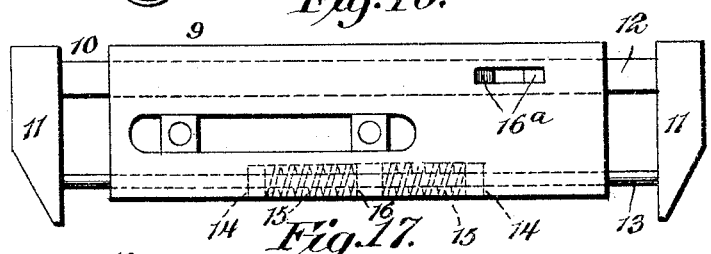
Figure 17:
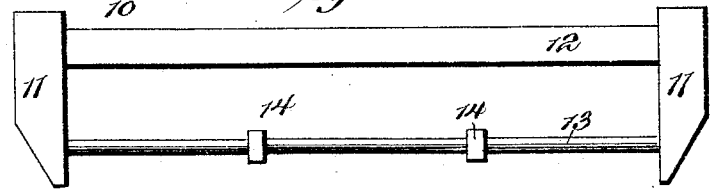

In the drawings, Figure 1 is a front elevation of a band-saw mill provided with an automatic saw-guide constructed in accordance with this invention. Fig. 2 is a side elevation of the same. Fig. 3 is a plan view. Fig. 4 is an enlarged detail view, partly in section, illustrating the construction for automatically operating the emergency-valve. Fig. 5 is an enlarged detail elevation showing a portion of the guide. Fig. 6 is a detail view of the vertically-movable cylinder and the controlling-valve, illustrating the arrangement of the telescoping pipe connections between the cylinder and the valve. Fig. 7 is a detail sectional view of one of the telescoping pipe connections. Figs. 8 and 9 are detail views of the cylinder. Fig. 10 is a detail view of the controlling-valve for enabling the saw-guide to be raised and lowered by hand. Figs. 11 and 12 are detail views of the casing of the emergency-valve. Fig. 13 is a detail sectional view taken practically on the line 13 13 of Fig. 11, the cylinder being in position. Figs. 14 and 15 are detail views of the controlling-valve and the pipe connections. Fig. 16 is a detail view of the saw-guide and the shiftable operating device. Fig. 17 is a detail view of the operating device. Fig. 18 is a detail view of the antifriction device of the spring-actuated rod or plunger and the actuating portion of the shiftable device.

Like numerals of reference designate corresponding parts in all the figures of the drawings.

1 designates the main frame of the band-saw mill, from the bed-plate of which rises columns 2, and slidably mounted on the latter are vertically-movable supports 3, which carry the upper band-saw wheel 4 and which are capable of vertical adjustment to arrange the band-saw wheels to accommodate saws of different lengths. As the means for adjusting the vertically-slidable supports does not constitute a portion of the present invention, a detail description and illustration of the same is deemed unnecessary.

The vertically-slidable support at one side of the band-saw wheel is provided with parallel vertical guides or ways 5, located at opposite sides of the support and presenting inwardly or rearwardly converging faces, with which is interlocked a vertically-movable slide 6, secured to a vertically-movable cylinder 7 and provided with an outwardly-extending arm 8. The arm 8 is arranged parallel with the plane of the band-saw wheel, as clearly illustrated in Fig. 3 of the drawings, and a band-saw guide 9 is secured to and supported by the arm, as hereinafter explained. The cylinder, which has a limited vertical movement, as hereinafter explained, the slide, which is operated by the cylinder, and the band-saw guide, which is supported by the arm of the slide, are all carried by the slidable support of the upper band-saw wheel when the latter is adjusted, so that the adjustment of the upper band-saw wheel cannot affect the arrangement of the band-saw guide with relation to the said wheel, and there is no liability of the guide accidentally coming in contact with the band-saw wheel through any adjustment of the latter.

The band-saw guide, which may be of any desired construction and a detail description of which is therefore unnecessary, may be secured to the arm of the slide in any desired manner, and it is provided with a shiftable device 10, which extends in advance and in rear of the saw-guide and which is adapted when struck by a log to operate an emergency-valve, hereinafter explained, whereby the saw-guide will be automatically lifted clear of a log to prevent it from being injured by the same. The shiftable operating device consists of a reciprocatory frame provided at its ends with upright ends or heads 11, projecting slightly below the upper saw-guide and having its lower portion beveled, as clearly shown in Fig. 17. These ends or heads 11, which are normally spaced from the ends of the saw-guide, are connected by upper and lower rods or bars 12 and 13, which extend through openings of the saw-guide, whereby the shiftable emergency-valve-operating device is slidably mounted on the saw-guide; but it may be mounted on the saw-guide in any other desired manner, as will be readily understood. The lower rod or bar is preferably round, as shown, and it is provided with opposite stops 14, adapted to be engaged by centering-springs 15, which yieldably hold the automatically-shiftable device in a central position and which permit the said device to be reciprocated in either direction. These springs also automatically return the shiftable device to a central position, and thereby permit the emergency-valve to return to its normal position after the upper saw-guide has been elevated sufficiently to clear the log.

The springs 15 are interposed between shoulders 16 of the saw-guide and the said stops 14, suitable recesses being provided in the saw-guide for the springs; but the latter may be housed in any desired manner, as will be readily understood. The upper rod or bar is preferably oblong in cross-section, as shown, and it is provided between its ends with opposite angularly-disposed faces 16ª, preferably formed by recessing the upper rod or bar and adapted when the shiftable device is actuated by a log to engage a spring-actuated rod or plunger 17 of the emergency-valve, (see Fig. 18,) whereby the latter will be operated. Instead of recessing the upper rod or bar to form the angularly-disposed portions the latter may be constructed by bending the rod or in any other desired manner, as will be readily understood. The ends or heads are arranged vertically, and the upper and lower bars or rods 12 and 13, which connect the heads, are horizontal, being disposed transversely of the arm of the slide and extending from opposite sides thereof. The rod or plunger 17, which may be connected with the emergency-valve 35 in any desired manner or form an integral part thereof, is moved outward automatically by a spring 18 after it has been moved inward by the shiftable operating device and the saw-guide has been raised sufficiently to clear the log. When the rod or plunger is reciprocated by the shiftable operating device, the spring is compressed and is adapted to actuate the emergency-valve as soon as the same is free to move.

The cylinder receives the head 37 of a fixed piston 38, and the rod thereof, which extends through the bottom of the cylinder and the casing 39 of the emergency-valve, is suitably secured at its lower end to a horizontal cross-head 40. The cross-head 40 is centrally connected with the lower end of the piston-rod, and it is secured at its ends to the lower terminals of the supporting-rods 41, which depend from perforated lugs or ears 42, located at opposite sides of the slide and projecting laterally therefrom, as clearly illustrated in Fig. 5 of the accompanying drawings. The cylinder may be actuated by any suitable means—such as steam, compressed air, or any other fluid or aeriform fluid under pressure—and such fluid is admitted above the piston-head 37 to raise the cylinder and the vertically-movable slide and is admitted below the piston-head to move the cylinder and the slide in the opposite direction. The ports of the cylinder are located a sufficient distance from the ends thereof to enable the fluid remaining in the cylinder to cushion the same at the end of either stroke.

The cylinder is adapted to be operated by hand to adjust the guide to the desired elevation, and a four-way controlling-valve 43 is provided for this purpose. The four-way controlling-valve, which is preferably round or spherical, as illustrated in Figs. 10, 14, and 15, is provided with a valve-plug 44, arranged in the spherical or globular casing and having an arm 45, which is connected by a link 46 with an operating-lever 47, suitably mounted on the main frame of the band-saw mill and adapted to be oscillated to actuate the valve-plug. The valve-plug is provided with a centrally-reduced portion 48, which operates in a cylindrical chamber 49 of the valve-casing, and the latter is provided at the top, bottom, and sides with bores or openings communicating with the central chamber by reduced ports 50 of a diameter less than the thickness of the reduced portion 48 of the valve-plug. The main steam-supply pipe 51 is connected with the valve-casing at the right-hand side of Fig. 14, and the exhaust-pipe 52 is connected with the valve-casing at the opposite side. The pipe 53, which is arranged at the top of the casing, extends to the bottom of the cylinder, and the pipe 54 at the bottom of the casing extends to the top of the cylinder. When the valve is arranged as illustrated in Fig. 14 of the accompanying drawings, fluid under pressure is admitted to the pipe leading to the bottom of the cylinder, and the pipe 54, which is connected with the top of the cylinder, is put in communication with the exhaust-pipe 52, thereby permitting the fluid above the piston to exhaust and admitting fluid below the piston-head to force the cylinder downward. When the cylinder has been properly adjusted, the valve, or rather the reduced portion 48 thereof, is brought into the position illustrated in dotted lines in Fig. 14. The edges of the reduced portion of the valve cover the steam inlet and exhaust ports of the casing, as shown in dotted lines, and the cylinder is maintained in its adjusted position.

The emergency-valve casing, which is suitably secured to the lower end of the cylinder, is provided with a horizontal tubular portion 55 for the reception of the emergency-valve 35, which is rounded, as clearly shown in Fig. 8, and which is provided with reduced portions 56 and 57, adapted when the emergency-valve is operated as before described to establish communication between upper and lower portions of an emergency steam-inlet 58 and to place the lower portion of the cylinder in communication with the emergency exhaust-pipe 59, whereby the fluid under pressure for actuating the cylinder will be admitted above the piston-head to raise the cylinder automatically when the shiftable emergency-valve-operating device is moved in either direction from its central position. As soon as the shiftable device is returned to its central position by the oppositely-disposed centering-springs the emergency-valve will be automatically actuated by the spring 18 of its rod or plunger, and the emergency steam inlet and exhaust pipe will be closed. The steam-inlet pipe 51 is tapped adjacent to the globular casing for the emergency-pipe 58, a coupling being employed for making the connection, and by this arrangement live steam or other fluid is admitted to the emergency-pipe 58. The exhaust-pipe 52 is similarly tapped adjacent to the globular casing for the emergency exhaust-pipe 59.

The emergency feed and exhaust pipes leading to the top and bottom of the cylinder are provided with telescoping portions or connections, as illustrated in Figs. 6 and 7 of the drawings. Each pipe is provided with a reduced section or bar 61, which is rigidly connected with the emergency-valve casing and which extends through a stuffing-box 62 into the lower portion or section of the pipe. By this arrangement the vertical movement of the cylinder and the slide does not effect the pipe connections between the cylinder and the controlling-valve, which is mounted on the main frame of the band-saw mill.

The emergency-valve casing (see Figs. 11 and 12) is provided with an inclined passage 63, extending upward and outward through the casing from the bottom thereof to receive the sections of the pipe which extends to the top of the cylinder. The casing is also provided adjacent to the inclined passage with a passage 64, extending upward from the bottom of the casing and terminating short of the upper face of the same and communicating with the bottom of the cylinder and with the tubular portion of the casing to enable a communication to be established between the emergency-exhaust and the bottom of the casing. The passage 64 is approximately L-shaped, as illustrated in Fig. 12 of the drawings, and it has an upwardly-extending portion 65 to communicate with the bottom of the cylinder, as illustrated in Fig. 13. The emergency feed or supply pipe sections communicate with a vertical passage 66, which extends entirely through the emergency-valve casing, as clearly shown in Fig. 8. The emergency-exhaust pierces the bottom of the emergency-valve casing at the tubular portion thereof and is placed in communication with the passage 64 of the emergency-valve.

In order to reduce the friction to a minimum and enable the spring-actuated rod or plunger of the emergency-valve to be readily actuated by the angularly-disposed faces or cam portions of the shiftable operating device, an antifriction device is employed. This antifriction device preferably consists of a wheel 19, arranged horizontally and mounted in a bifurcation of the rod or plunger and bearing against the upper rod or bar of the actuating device and normally seated in the slot or recess which forms the angularly-disposed actuating portions of the upper rod or bar. Instead of arranging a wheel in this manner any other form of antifriction device may be used for this purpose.

It will be seen that the piston and the cylinder form an efficient motor for actuating the slide or support which carries the guide and that the said motor is adapted to be readily operated by hand to adjust the guide and that it is capable of being automatically operated, whereby the guide is raised when it is struck by a log, thereby preventing injury to the guide. Furthermore, it will be clear that the motor is carried by the vertically-slidable supports of the upper band-saw wheel and that the adjustment of such vertically-slidable supports will not in any manner interfere with the automatic operation of the motor.

Having thus fully described my invention, what I claim as new, and desire to secure by Letters Patent, is—

1. The combination with a saw-guide, a motor for raising and lowering the guide, and an automatically-shiftable device mounted on the guide and movable independently thereof for operating the motor, substantially as described.

2. The combination of a guide, a motor for raising the guide, and a device slidable on the guide for operating the motor, substantially as described.

3. The combination of a guide, a motor for raising the guide, and an operating device arranged to be struck by a log and movable in the direction of the travel of the same, substantially as described.

4. The combination of a guide, a motor for raising the guide, and a horizontally-movable operating device arranged to be struck by a log, substantially as described.

5. The combination of a guide, a motor for raising the guide, and a shiftable device mounted on the guide and extending in advance and in rear of the same and operable at either end for operating the motor, substantially as described.

6. The combination of a relatively rigid guide, a motor for raising the guide, and a movable device mounted on the guide for automatically operating the motor, substantially as described.

7. The combination of a guide, a motor for raising the guide, and an operating device projecting from both sides of the saw and operable at either end, substantially as described.

8. The combination of a guide, a motor for raising the same, a device mounted on the guide and movable independently of the same for automatically operating the motor, and means for returning the said device to its normal position with relation to the guide, substantially as described.

9. The combination of a guide, a motor for raising the same, a device mounted on the guide and movable in opposite directions and operable from either end for operating the motor, and means for automatically returning the device to its normal central position, substantially as described.

10. The combination of a guide, a motor for raising the same, and a shiftable device slidably mounted on the guide and extending in advance and in rear of the same and composed of end portions arranged to be engaged by a log and connecting portions, substantially as described.

11. The combination with a band-saw mill having vertically-movable supports for the upper band-saw wheel, of a guide carried by said vertically-movable supports, and means for adjusting the guide, substantially as described.

12. The combination with a band-saw mill having columns, supports for the upper band-saw wheel slidably mounted on the columns, of a guide carried by the supports, a cylinder having a piston, one of the parts being connected with the supports and the other with the guide, means for operating the cylinder and the piston by hand for raising and lowering the guide, and means for automatically operating the cylinder and piston when the guide is struck by a log, substantially as described.

13. The combination of a guide, a motor for raising the guide, a device slidable on the guide for operating the motor, and means for yieldably holding the slidable device and for returning the same to its normal position, substantially as described.

14. The combination of a support, a motor connected with the support for raising and lowering the same, a guide carried by the support, a rod or plunger connected with the motor for operating the same, a spring for moving the rod or plunger in one direction, and a shiftable device mounted on the guide for moving the rod or plunger in the opposite direction when the said shiftable device is struck by a log, substantially as described.

15. The combination of a saw-guide, a motor for raising the same, a shiftable reciprocating device mounted on the guide and composed of upright ends or heads arranged to be engaged by a log and upper and lower rods or bars connecting the ends or heads, one of the bars being provided with means for operating the motor, and springs mounted on the other rod or bar for automatically centering the device, substantially as described.

16. The combination with a support having an arm, of a saw-guide fixed to the same, a motor for raising the support, a shiftable device movable independently of the guide for operating the motor and provided with portions located in advance and in rear of the guide and adapted to be engaged by a log, and means for yieldably holding the shiftable device in such position and for returning the same to its normal position after operation by a log, substantially as described.

17. The combination with a band-saw mill having vertically-movable supports for the upper band-saw wheel, of a vertically-movable slide carried by the support, a guide connected with the slide, a motor having a cylinder movable with the slide and provided with a fixed piston, and means for operating the motor, said means embodying a controlling-valve mounted on the frame of the band-saw mill, an emergency-valve movable with the cylinder, and pipes having telescoping portions composed of fixed and movable sections, the fixed sections being connected with the frame of the band-saw mill, and the movable sections being connected with and carried by the cylinder, substantially as described.

18. The combination with a band-saw mill having vertically-movable supports for the upper band-saw wheel, of a slide carried by the supports, a motor also carried by the supports and having a cylinder movable with the slide, a guide carried by the slide, and operating means for the motor embodying pipes having telescoping portions, and controlling and emergency valves mounted respectively on the frame of the band-saw mill and on the cylinder, substantially as described.

19. The combination with a band-saw mill having vertically-movable supports for the upper band-saw wheel, of a slide carried by the supports, a motor also carried by the supports and provided with a movable cylinder connected with the slide for raising and lowering the same, a guide, means connected with the frame of the band-saw mill for operating the motor to raise and lower the guide by hand, and an emergency-valve movable with the cylinder for automatically raising the guide when the latter is struck by a log, substantially as described.

20. The combination with a band-saw mill having vertically-movable supports for the upper band-saw wheel, of a vertically-movable guide carried by the supports, a motor also carried by the supports and provided with a movable cylinder connected with the guide, an emergency-valve mounted on the cylinder for automatically raising the guide when the same is struck by a log, and means connected with the frame of the band-saw mill for operating the motor by hand to adjust the guide, substantially as described.

21. The combination with a band-saw mill having vertically-movable supports for the upper band-saw wheel, of a slide carried by the supports, a motor also carried by the supports and having a movable cylinder connected with the slide, a guide mounted on the slide, and means movable with the cylinder for automatically operating the motor to raise the guide when the same is struck by a log, substantially as described.

22. The combination of a vertically-movable support, a guide connected therewith, a motor composed of a cylinder connected with the support and movable vertically with the same, a piston operating in the cylinder and fixed with relation to the slide, a controlling-valve mounted on the frame of the band-saw mill, an emergency-valve mounted on the cylinder, pipes extending from the top and bottom of the cylinder to the controlling-valve, and exhaust and feed pipes also connected with the controlling-valve, substantially as described.

23. The combination of a vertically-movable support, a guide carried by the same, a motor composed of a fixed piston and a movable cylinder connected with the support, a controlling-valve mounted on the frame of the band-saw mill, an emergency-valve mounted on the cylinder, pipes extending from the top and bottom of the cylinder to the controlling-valve and having telescoping portions, and feed and exhaust pipes also connected with the controlling-valve, substantially as described.

24. The combination of a vertically-movable support, a guide carried by the same, a motor composed of a fixed piston and a movable cylinder connected with the support, a controlling-valve, pipes extending from the top and bottom of the cylinder to the controlling-valve, feed and exhaust pipes also connected with the controlling-valve, emergency feed and exhaust pipes connected with the said feed and exhaust pipes and with the top and bottom of the cylinder, and an emergency-valve mounted on the cylinder, substantially as described.

25. The combination of a vertically-movable support, a guide carried by the same, a motor connected with the support, a controlling-valve, pipes extending from the top and bottom of the cylinder to the controlling-valve, feed and exhaust pipes also connected with the controlling-valve, emergency feed and exhaust pipes connected with the said feed and exhaust pipes and with the top and bottom of the cylinder, and an emergency-valve mounted on the cylinder, substantially as described.

26. The combination of a vertically-movable support, a guide carried by the support, a motor connected with the support, a controlling-valve, pipes extending from the controlling-valve to the top and bottom of the motor, main feed and exhaust pipes connected with the controlling-valve, emergency feed and exhaust pipes connected with the said feed and exhaust pipes and with the motor, an emergency-valve mounted on the cylinder, and means for automatically operating the emergency-valve, substantially as described.

In testimony that I claim the foregoing as my own I have hereto affixed my signature in the presence of two witnesses.

FRANCIS THOMAS McDONOUGH.

Witnesses:
  Roy P. Wilcox,
  Hannah F. Johnson.